UNITED STATES PATENT OFFICE.

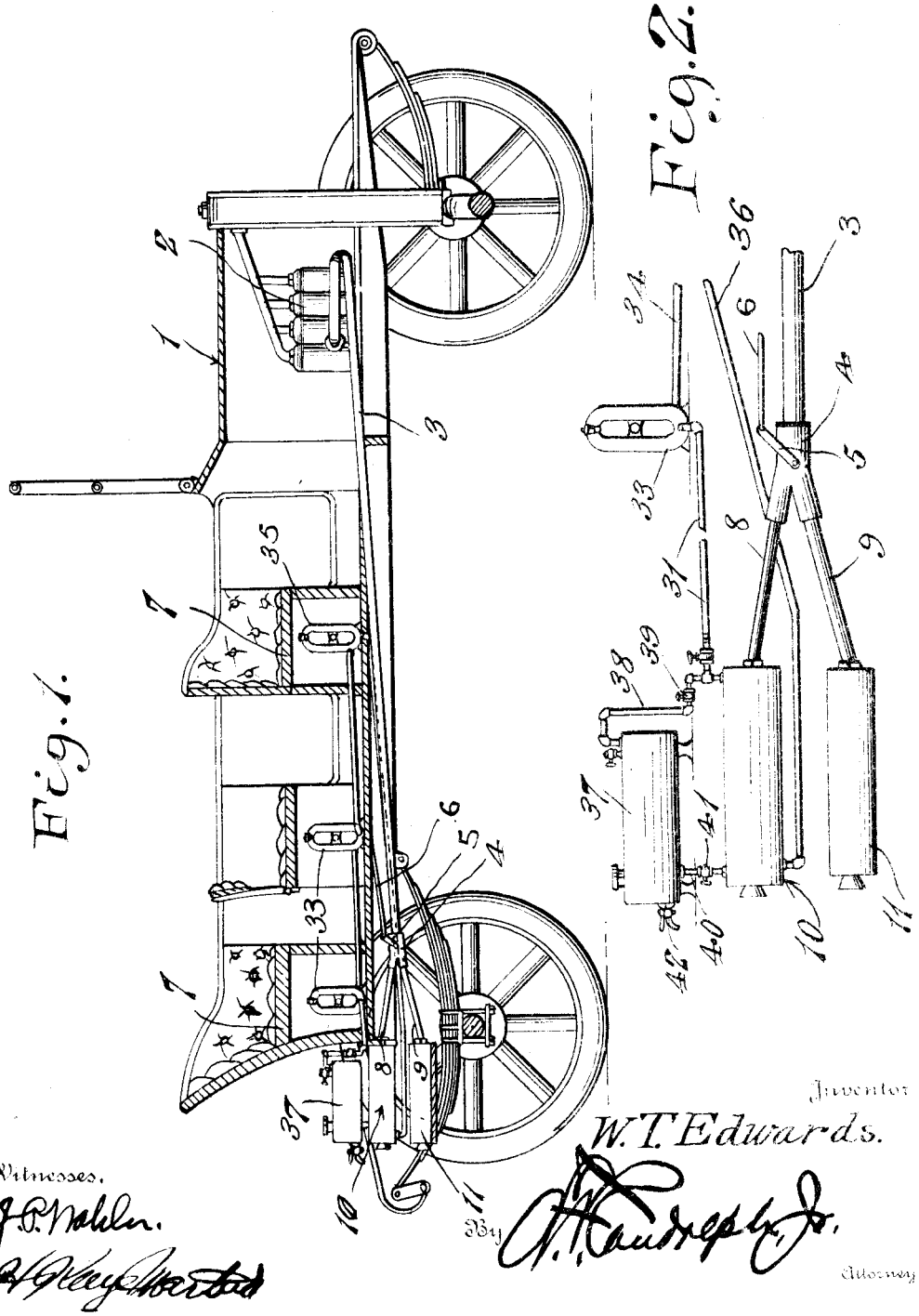

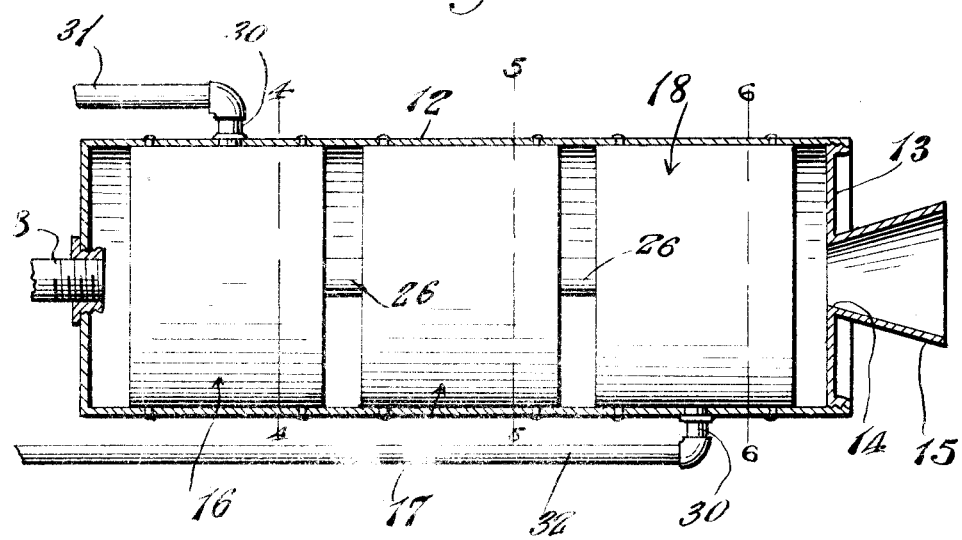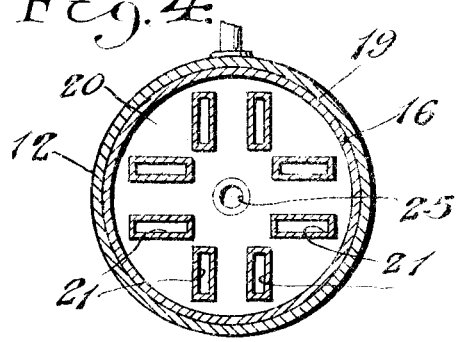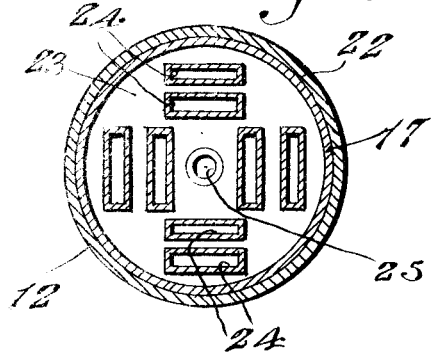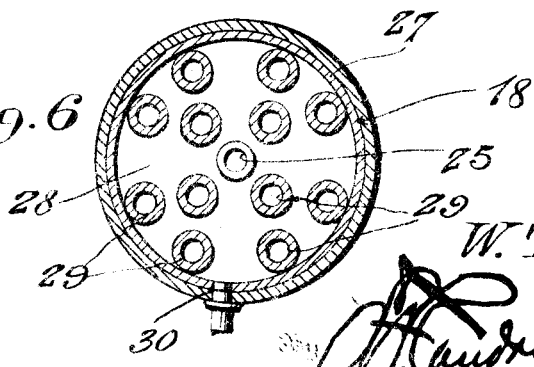

WALTER T. EDWARDS, OF MINOT, NORTH DAKOTA.

VEHICLE-HEATER.

1,194,977.  Specification of Letters Patent.  Patented Aug. 15, 1916.

Application filed November 21, 1914. Serial No. 873,376.

*To all whom it may concern:*

Be it known that I, WALTER T. EDWARDS, a citizen of the United States, residing at Minot, in the county of Ward and State of North Dakota, have invented certain new and useful Improvements in Vehicle-Heaters; and I do hereby declare the following to be a full, clear, and exact description of the invention, such as will enable others skilled in the art to which it appertains to make and use the same.

This invention relates to new and useful improvements in vehicle heaters, and has for its principal object to provide a device which will effectively use the exhaust gases from the motor to heat the vehicle.

Another object of the invention is to provide a device which is designed to furnish hot water to the user for any desired purpose.

A further object of the invention is to provide a simple and efficient means for utilizing the exhaust gases for heating the car.

With these and other objects in view, the invention consists in the novel combination and arrangement of parts which will be fully set forth in the following specification and accompanying drawings, in which, Figure 1 is a sectional view of a car illustrating this attachment applied thereto, Fig. 2 is a diagrammatic view illustrating the method of connecting the heater with the exhaust of the vehicle, Fig. 3 is an enlarged detail sectional view of the heater illustrating the details of construction, Fig. 4 is a transverse sectional view taken on line 4—4 of Fig. 3, Fig. 5 is a detail sectional view taken on line 5—5 of Fig. 3, and Fig. 6 is a detail sectional view taken on line 6—6 of Fig. 3.

Referring now to the drawings by characters of reference, the numeral 1 designates as an entirety the vehicle provided with the usual power plant 2, having the exhaust pipe 3 extending rearwardly therefrom. This exhaust pipe extends beneath the floor of the car and terminates in the Y-fitting 4 which is provided with a suitable valve, which valve is controlled by the lever 5 to which the connecting rod 6 is secured. This connecting rod 6 extends forwardly to within close proximity of the driver's seat 7 and is designed to provide a means whereby the valve may be operated from the seat of the driver of the vehicle. Secured to the arms of the Y 4 are the branch pipes 8 and 9 which terminate in the water heater 10 and the muffler 11 respectively.

The water heater 10 hereinbefore referred to, is best illustrated in Figs. 3, 4, 5, and 6, and comprises the cylindrical body 12 which is provided with the end closure 13, which closure is secured in any suitable manner to the body. A suitable central outlet opening 14 is formed in the closure 13 and the funnel-shaped member 15 is secured to said closure and surrounds the aperture and is designed to direct the flow of exhaust gases from the heater. Secured within the heater are the drums designated generally by the numerals 16, 17, and 18, and these drums are arranged with tubes of varying sizes through which the exhaust gases pass. The drum 18 is provided with tubes of a smaller size, while the drum 16 is provided with tubes of a larger size, and the drum 17 with tubes of an intermediate size.

The drum 16 hereinbefore referred to, is best illustrated in Fig. 4 and comprises the cylindrical body 19 having the end closures 20 secured therein. A plurality of rectangular tubes 21 are secured within the body and the openings through the tubes are secured within the body and the openings through the tubes are arranged to register with openings formed in the end walls 20 to form a free passage therethrough. In the drum 16, the tubes are arranged in pairs, which pairs are arranged in parallel relation as clearly shown in Fig. 4. In the drum 17 the body 22, which is formed of sheet metal, is constructed in a manner similar to the body 19 and is provided with the end closures 23, which are also provided with apertures, and these apertures are arranged in parallel relation so that the tubes 24 will come parallel with each other and form flues through the drum. Suitable central apertures 25 are formed in each of the drums, and these apertures are preferably screw threaded to receive the pipes 26 by which the drums are connected. In the drum 18 the body 27 is formed of a single sheet of metal which is provided with the end closures 28, which end closures are apertured so that the pipes 29, when in place form flues therethrough, and this drum like the others is provided with the central apertures 25 to which the connecting pipe 26 is secured. In order that the engine drums may be used for the circulation of the liquid through the system, suitable connections 30 are provided and are arranged to be connected to the pipes 31 and 32 respectively which are for the outflow and return of water respectively. The pipe 31 is connected to one end of the rearmost radiator 33 and the pipe 34 leading from the opposite end thereof is connected to the radiator 35, which in turn is connected to the pipe 36, which pipe is connected to the return pipe 32. It will thus be seen that a circulating system is provided for the device which will keep the water in the radiators warm at all times.

In order that drinking water may be had, the tank 37 is provided and this tank carries the connecting pipe 38 having the valve 39 intermediate its ends, and this connecting pipe is connected to the supply pipe 31. A suitable pipe 40 having the valve 41 intermediate its ends, is connected to the heater 10, and it will thus be seen that a circulation may be had between the heater and the tank 37 at the desire of the user. In order that the water may be drawn from the tank there is provided the faucet 42, which may be controlled in any suitable manner.

It will be apparent from the foregoing that in use the exhaust passing from the motor 2 will pass through the pipes 3 and into the connection 4. When the user desires that the water be unheated, he opens the valve controlled by the lever 5 so that a free passage is obtained through the pipe 9 and muffler 11. In event it is desired that the water be heated the valve is shifted to the opposite position which will cause the exhaust to pass through the pipe 8 and water heater 10, thereby passing through the various tubes of the heating drums 16, 17, and 18, and causing the water contained in said drums to become heated. Due to the vast heating surface caused by the shape of the tubes, it will be apparent that by the time the water flows outwardly through the heating pipe 31, the same will be heated to well near the boiling point, thereby causing the radiators to become greatly heated. It will thus be seen that the car when so desired may be heated and if the user wishes, the whole system may be allowed to cool by reversing the position of the valve by the lever 5.

While in the foregoing there has been shown and described the preferred embodiment of this invention, it is to be understood that such changes may be made in the combination and arrangement of parts as will fall within the spirit and scope of the invention as defined in the appended claim.

What is claimed is:

A heater for motor vehicles of the class described including a cylindrical shell having both ends closed, said closed ends provided with central openings, a funnel shaped member positioned in one of said openings forming an outlet, said cylindrical shell being connected to the exhaust pipe of an engine of a vehicle through the openings in its opposite end, a plurality of annular drums located in said shell at relatively spaced distance apart, said drums being in communication with each other, each of said drums being provided with a plurality of flues, the flues varying in size from the inlet to the outlet, said drums forming heaters and baffle plates for the hot gases passing therethrough, and a return pipe connected to said shell at one end and an outlet pipe at the opposite end, and for the purpose specified.

In testimony whereof I affix my signature in presence of two witnesses.

WALTER T. EDWARDS.

Witnesses:
H. E. BYORUM,
F. W. ROACH.